United States Patent
Shigematsu et al.

(10) Patent No.: US 9,174,558 B2
(45) Date of Patent: Nov. 3, 2015

(54) SEAT OPERATING DEVICE AND VEHICLE SEAT

(71) Applicant: NHK SPRING CO., LTD., Yokohama-shi (JP)

(72) Inventors: Ryohei Shigematsu, Yokohama (JP); Takafumi Hirata, Yokohama (JP); Miho Nakazono, Yokohama (JP); Takeshi Nakamura, Yokohama (JP); Hiroshi Yagame, Yokohama (JP); Hironobu Okamura, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 0 days.

(21) Appl. No.: 14/242,735

(22) Filed: Apr. 1, 2014

(65) Prior Publication Data

US 2014/0300160 A1 Oct. 9, 2014

(30) Foreign Application Priority Data

Apr. 3, 2013 (JP) ................................. 2013-077772

(51) Int. Cl.
| | |
|---|---|
| *B60N 2/02* | (2006.01) |
| *B60N 2/44* | (2006.01) |
| *B60N 2/06* | (2006.01) |
| *B60N 2/22* | (2006.01) |
| *B60N 2/20* | (2006.01) |

(Continued)

(52) U.S. Cl.
CPC ............... *B60N 2/4435* (2013.01); *B60N 2/02* (2013.01); *B60N 2/06* (2013.01); *B60N 2/08* (2013.01); *B60N 2/16* (2013.01); *B60N 2/167* (2013.01); *B60N 2/169* (2013.01); *B60N 2/1615* (2013.01); *B60N 2/1814* (2013.01);

(Continued)

(58) Field of Classification Search
CPC ........ B60N 2/12; B60N 2/2218; B60N 2/123; B60N 2/366; B60N 2/1615; B60N 2/22; B60N 2/1695; B60N 2/0296; A47C 1/027; A47C 1/026
USPC ............... 297/358, 342, 344.1, 354.1, 354.12
See application file for complete search history.

(56) References Cited

U.S. PATENT DOCUMENTS

| | | | |
|---|---|---|---|
| 2007/0013218 A1* | 1/2007 | Kayumi et al. | 297/344.1 |
| 2009/0058158 A1* | 3/2009 | Sobieski | 297/338 |

(Continued)

FOREIGN PATENT DOCUMENTS

| | | | | |
|---|---|---|---|---|
| CA | 2438023 A1 * | 2/2004 | | |
| DE | 19962653 A1 * | 7/2000 | | B60N 2/07 |
| JP | 4758779 B2 | 8/2011 | | |

*Primary Examiner* — Laurie Cranmer
(74) *Attorney, Agent, or Firm* — Knobbe Martens Olson & Bear LLP

(57) ABSTRACT

A seat operating device comprising: an operation member; a first clutch member that is connected to an adjusting mechanism, and in which is formed a first cut-out portion that opens outwardly in a rotation radial direction of the first clutch member; a second clutch member that is connected to another adjusting mechanism, and in which is formed a second cut-out portion that opens outwardly in a rotation radial direction of the second clutch member; and a switching member having a first engaging portion and a second engaging portion that are positioned at mutually opposite sides across a rotational center. When the switching member is positioned at one end of a range of movement of the switching member, the first engaging portion engages with the first cut-out portion, and, when the switching member is positioned at another end of the range of movement, the second engaging portion engages with the second cut-out portion.

4 Claims, 5 Drawing Sheets

(51) Int. Cl.
*B60N 2/08* (2006.01)
*B60N 2/16* (2006.01)
*B60N 2/18* (2006.01)

(52) U.S. Cl.
CPC ............... *B60N 2/1882* (2013.01); *B60N 2/20* (2013.01); *B60N 2/224* (2013.01)

(56) References Cited

U.S. PATENT DOCUMENTS

2009/0267397 A1* 10/2009 Kubota .................... 297/344.15
2010/0109406 A1* 5/2010 Ueda ............................ 297/358

* cited by examiner

SEAT OPERATING DEVICE AND VEHICLE SEAT

CROSS-REFERENCE TO RELATED APPLICATION

This application claims priority under 35 USC 119 from Japanese Patent Application No. 2013-077772 filed on Apr. 3, 2013, the disclosure of which is incorporated by reference herein.

BACKGROUND OF THE INVENTION

1. Technical Field

The present invention relates to a seat operating device for operating adjusting mechanisms provided at a vehicle seat, and to a vehicle seat.

2. Related Art

A seat adjusting device disclosed in Japanese Patent No. 4758779 includes: an operation lever to which operational force is applied due to operation of a seated person; a lifter plate for transmitting operational force of the operation lever to a height adjusting mechanism of a seat cushion; a reclining plate for transmitting operational force of the operation lever to an angle adjusting mechanism of a seat back; and a switching mechanism able to selectively transmit operational force of the operation lever to the lifter plate to the reclining plate.

The aforementioned switching mechanism is structured so as to, in accordance with the operation of a switching knob that is mounted to the operation lever, switch between a first engaged state in which a switching pin engages with an engaging groove of the lifter plate, and a second engaged state in which the switching pin engages with an engaging groove of the reclining plate. Due thereto, two adjusting mechanisms can be operated selectively by one operation lever.

SUMMARY

However, in the adjusting device disclosed in Japanese Patent No. 4758779, there is a structure in which the switching pin (an engaging portion) is moved between the engaging groove (a cut-out portion) that is formed in the outer peripheral portion of the reclining plate, and the engaging groove (a cut-out portion) that is formed in the inner peripheral portion of the lifter plate. Therefore, the lifter plate, that is formed in the shape of a ring and is disposed at the outer side of the outer periphery of the reclining plate, becomes large.

In consideration of the above-described circumstances, a subject of the present invention is to provide a seat operating device that can selectively transmit operational force of one operation member to plural adjusting mechanisms provided at a seat main body and that can reduce the sizes of structural members, and a vehicle seat at which the seat operating device is provided.

A seat operating device of a first aspect of the present invention has: an operation member that is mounted to a seat main body of a vehicle seat so as to be rotatingly operated; a first clutch member that is mounted to the seat main body so as to rotate around a rotational center of the operation member, and that is connected to an adjusting mechanism that the seat main body is equipped with, and in which is formed a first cut-out portion that opens outwardly in a rotation radial direction of the first clutch member; a second clutch member that is mounted to the seat main body so as to rotate around the rotational center of the operation member, and that is connected to another adjusting mechanism that the seat main body is equipped with, and in which a second cut-out portion, that opens outwardly in a rotation radial direction of the second clutch member, is formed at an opposite side of the first cut-out portion across the rotational center; and a switching member that is mounted to the operation member so as to be movingly operated in a rotation radial direction of the operation member, and that has a first engaging portion and a second engaging portion that are positioned at mutually opposite sides across the rotational center, and, in a state in which the switching member is positioned at one end of a range of movement of the switching member, the first engaging portion engages with the first cut-out portion, and, in a state in which the switching member is positioned at another end of the range of movement of the switching member, the second engaging portion engages with the second cut-out portion.

In the first aspect, the operation member is mounted to the seat main body of a vehicle seat so as to be rotatingly operated. The first clutch member and an adjusting mechanism that the seat main body is equipped with are connected, and the second clutch member and another adjusting mechanism that the seat main body is equipped with are connected. The switching member is mounted to the operation member so as to move in the rotation radial direction of the operation member.

In a state in which the switching member is positioned at one end of a range of movement of the switching member, the first engaging portion that is provided at the switching member engages with the first cut-out portion of the first clutch member. In this state, when the operation member is rotatingly operated, the first clutch member rotates integrally with the operation member, and the operational force of the operation member is transmitted to the adjusting mechanism that is connected to the first clutch member.

In a state in which the switching member is positioned at the other end of the range of movement of the switching member, the second engaging portion that is provided at the switching member engages with the second cut-out portion of the second clutch member. When the operation member is rotatingly operated in this state, the second clutch member rotates integrally with the operation member, and the operational force of the operation member is transmitted to the other adjusting mechanism that is connected to the second clutch member.

Here, in the present invention, the first engaging portion and the second engaging portion of the switching member are positioned at mutually opposite sides across the center of rotation of the first clutch member and the second clutch member. Further, the first cut-out portion of the first clutch member, with which the first engaging portion engages, and the second cut-out portion of the second clutch member, with which the second engaging portion engages, respectively open outwardly in the rotation radial directions of the respective clutch members. Because of such a structure, as compared with a structure in which a cut-out portion, that opens inwardly in the rotation radial direction, is formed in one of the first clutch member and the second clutch member, and one engaging portion is moved between this inwardly-facing cut-out portion and an outwardly-facing cut-out portion that is formed in the other clutch member, the one clutch member can be made to be compact.

Moreover, in the present invention, the shapes and the sizes of the first engaging portion and the second engaging portion can respectively be selected individually in accordance with the needed operational forces of the adjusting mechanism that is connected to the first clutch member and the other adjusting mechanism that is connected to the second clutch member. Therefore, the flexibility for design can be improved.

A seat operating device of a second aspect of the present invention further has, in the first aspect, a pair of erroneous operation preventing portions that are provided so as to be unable to be displaced with respect to the seat main body and that face one another in a direction of rotation of the operation member, and, in a state in which the switching member is positioned intermediately in the range of movement, one of the first engaging portion and the second engaging portion is disposed between the pair of erroneous operation preventing portions.

In the second aspect, in a state in which the switching member is positioned intermediately in the range of movement with respect to the operation member, i.e., in a state in the midst of operation of the switching member, one of the first engaging portion and the second engaging portion that are provided at the switching member is disposed between the pair of erroneous operation preventing portions that are provided so as to be unable to be displaced with respect to the seat main body. In this state, rotational operation of the operation member is restricted, as the one of the engaging portions abuts the pair of erroneous operation preventing portions in the direction of rotation of the operation member. Due thereto, erroneous operation that is caused by rotatingly operating the operation member in the midst of operation of the switching member can be prevented.

A seat operating device of a third aspect of the present invention further has, in the second aspect, a base bracket, wherein the operation member and the first clutch member are mounted to the seat main body via the base bracket, and the pair of erroneous operation preventing portions are provided at the base bracket.

In the invention of the third aspect, the base bracket, that is provided for mounting the operation member and the first clutch member to the seat main body, also has the function of restricting the rotational operation of the operation member in the midst of operation of the switching member. Therefore, the number of parts can be reduced.

In a seat operating device of a fourth aspect of the present invention, in the second aspect or the third aspect, a dimension, along a direction of movement of the switching member, of one of the first engaging portion and the second engaging portion is set to be smaller than a dimension of another of the first engaging portion and the second engaging portion.

In the fourth aspect, in a state in which the switching member is positioned intermediately in the range of movement with respect to the operation member (a state in the midst of operation of the switching member), one of the first engaging portion and the second engaging portion is disposed between the pair of erroneous operation preventing portions that are provided so as to be unable to be displaced with respect to the seat main body. The dimension, along the direction of the movement of the switching member, of one of these first engaging portion and second engaging portion is set to be smaller than the dimension of the other of the first engaging portion and the second engaging portion. Due thereto, the amount of movement (the operation stroke) of the switching member, that is needed in order for the one of the first engaging portion and second engaging portion to pass-through between the pair of erroneous operation preventing portions, can be set to be short, and therefore, the operability of the switching member can be improved.

A vehicle seat of a fifth aspect of the present invention has: a seat main body that is for seating of a passenger and at which plural adjusting mechanisms are provided; and the seat operating device of any one of the first aspect through the fourth aspect at which the operating member, the first clutch member and the second clutch member are mounted to the seat main body, and the adjusting mechanisms are connected to the first clutch member and the second clutch member respectively.

In the fifth aspect, the seat operating device of any one of the first aspect through the fourth aspect is mounted to the seat main body. Therefore, operation and effects that are similar to those of the invention of any one of the first aspect through the fourth aspect are achieved.

As described above, in the vehicle seat relating to the present invention, operational force of single operation member can selectively be transmitted to plural adjusting mechanisms that are provided at a seat main body, and the sizes of the structural members of the seat operating device can be reduced.

BRIEF DESCRIPTION OF THE DRAWINGS

Embodiments of the present invention will be described in detail based on the following figures, wherein.

DETAILED DESCRIPTION OF THE INVENTION

A seat operating device 10 and a vehicle seat 12 relating to an embodiment of the present invention are described hereinafter with reference to FIG. 1 through FIG. 5. Note that arrow FR that is shown appropriately in the respective drawings indicates the front direction of the vehicle seat 12, and arrow UP indicates the upward direction of the vehicle seat 12. Further, in the present embodiment, the front-rear direction, the up-down direction and the width direction of the vehicle seat 12 coincide with the front-rear direction, the up-down direction and the width direction of the vehicle.

(Structure)

Figure 1:
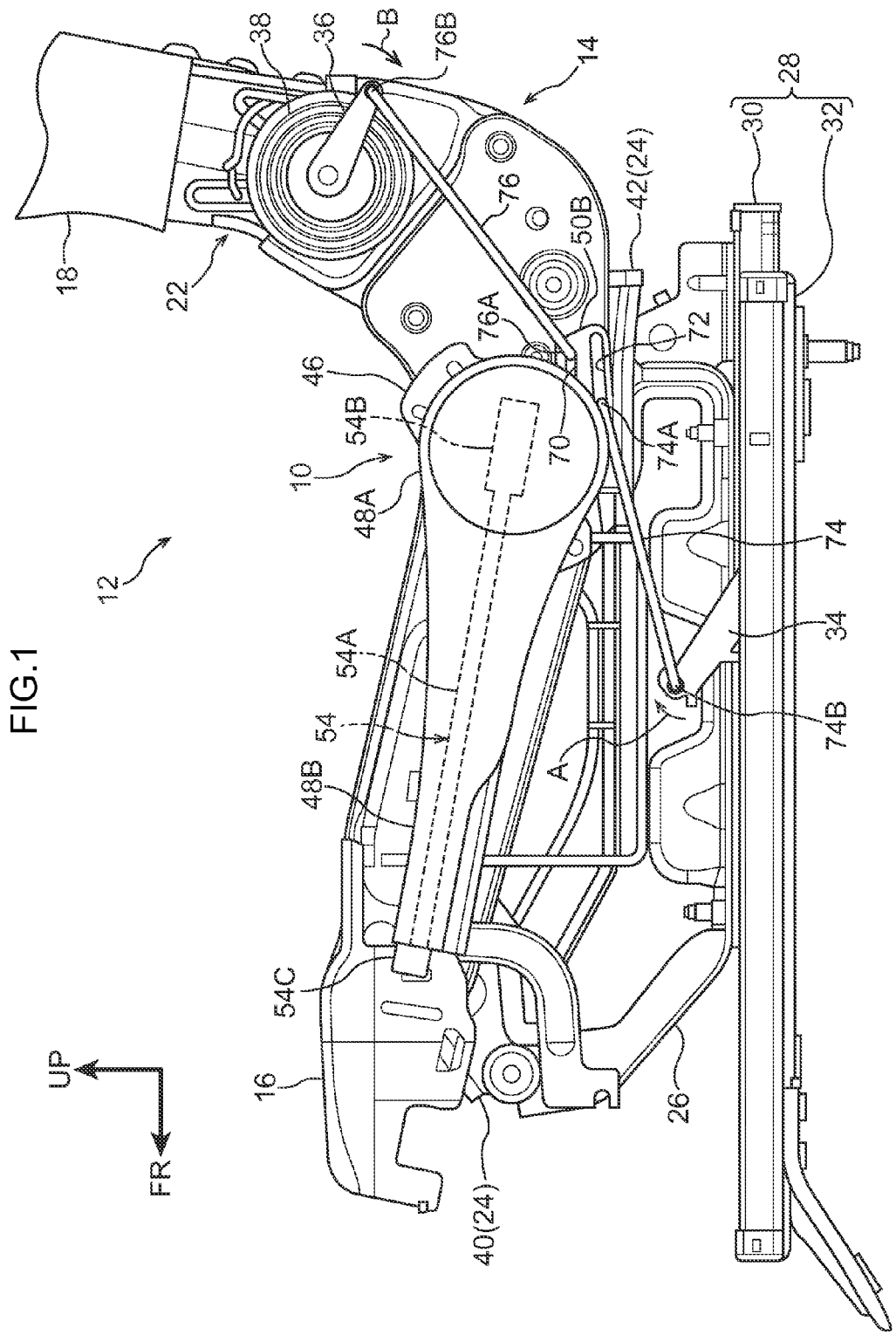
FIG. 1 is a side view showing the structure of main portions of a vehicle seat relating to an embodiment of the present invention.

As shown in FIG. 1, the vehicle seat relating to the present embodiment is structured by a seat main body 14 and the seat operating device 10. The seat main body 14 is set on a top surface of an unillustrated vehicle body floor portion. The seat main body 14 has a seat cushion frame 16 that structures the skeleton of a seat cushion, and a seat back frame 18 that structures the skeleton of a seat back. Respective seat pads that are not illustrated are mounted to the seat cushion frame 16 and the seat back frame 18, and surfaces of the respective seat pads are covered by seat skins that are not illustrated. A sliding mechanism 20, a reclining mechanism 22, and a lifter mechanism 24 (all of which are adjusting mechanisms) are provided at this seat main body 14.

The sliding mechanism 20 is an adjusting mechanism for adjusting the front-rear position of the seat main body 14 with respect to the vehicle body floor portion, and is structured to include slide rails 28 that are disposed beneath a lower frame 26. At the slide rail 28, an upper rail 30, that is fixed to the lower end portion of the lower frame 26 that is provided at the seat main body 14, is supported so as to be slidable in the seat front-rear direction by a lower rail 32 that is fixed to the vehicle body floor portion.

The above-described sliding mechanism 20 is a locking-type adjusting mechanism, and has a lock mechanism that is not illustrated and that restricts the sliding of the upper rails 30 with respect to the lower rails 32. At this lock mechanism, the aforementioned restricting (locking) is released due to a lock releasing lever 34, that is axially-supported at the upper rail 30, being rotated in a lock releasing direction (the arrow A direction in FIG. 1). Due thereto, there becomes a state in which the upper rails 30 can slide with respect to the lower rails 32, i.e., adjustment of the front-rear position of the seat main body 14 with respect to the vehicle body floor portion is possible.

The reclining mechanism 22 is an angle adjusting mechanism that inclinably connects the seat back to the seat cushion. The reclining mechanism 22 is provided between the rear end portion of the seat cushion frame 16 and the lower end portion of the seat back frame 18. This reclining mechanism 22 is a locking-type adjusting mechanism, and has a lock mechanism that is not illustrated and that restricts inclining of the seat back frame 18 with respect to the seat cushion frame 16. At this lock mechanism, the aforementioned restricting (locking) is released due to a lock releasing lever 36 being rotated in a lock releasing direction (the arrow B direction in FIG. 1). Due thereto, there becomes a state in which the reclining angle of the seat back frame 18 with respect to the seat cushion frame 16 can be adjusted in plural stages.

Further, a spiral spring 38, that urges the seat back frame 18 in a direction of inclining forward, is provided between the seat cushion frame 16 and the seat back frame 18. Therefore, when load is not applied to the seat back frame 18 in the lock released state of the reclining mechanism 22, the seat back frame 18 inclines forward to a predetermined position with respect to the seat cushion frame 16. On the other hand, when load of a predetermined value or greater in rear direction is applied to the seat back frame 18 in the lock released state of the reclining mechanism 22, the seat back frame 18 inclines rearward with respect to the seat cushion frame 16. Further, when the operational force of the lock releasing lever 36 is released at an arbitrary angle of inclination, the reclining mechanism 22 reverts back to the locked state, and the seat back frame 18 is restrained such that inclining thereof is restricted.

The lifter mechanism 24 is an adjusting mechanism for adjusting the seat surface height of the seat cushion, and is interposed between the seat cushion frame 16 and the lower frame 26, and connects the both. This lifter mechanism 24 has a front side link 40 and a rear side link 42 that are connected to the seat cushion frame 16 and the lower frame 26 so as to rotate freely. The front side link 40 and the rear side link 42, together with the seat cushion frame 16 and the lower frame 26, structure a four-link construction.

The above-described lifter mechanism 24 is an operation-type adjusting mechanism, and has a pump-type lifter device (not illustrated) that is conventionally known. This pump-type lifter device is mounted to the side surface at the vehicle width direction outer side of the seat cushion frame 16, and has an input shaft whose axial direction runs along the seat width direction. When this input shaft is rotated, the rotational force of this input shaft is transmitted to the rear side link 42 via a pinion and lifter gears (not illustrated) that are mounted to the seat cushion frame 16. Due thereto, the rear side link 42 and the front side link 40 rotate, and the height at which the seat cushion frame 16 is disposed with respect to the lower frame 26 is adjusted. Note that, in the present embodiment, the operational force that is needed in order to adjust the lifter mechanism 24 is set to be higher than the operational force that is needed in order to release the locking of the sliding mechanism 20 and the reclining mechanism 22.

The seat operating device 10 is described next.

Figure 2:
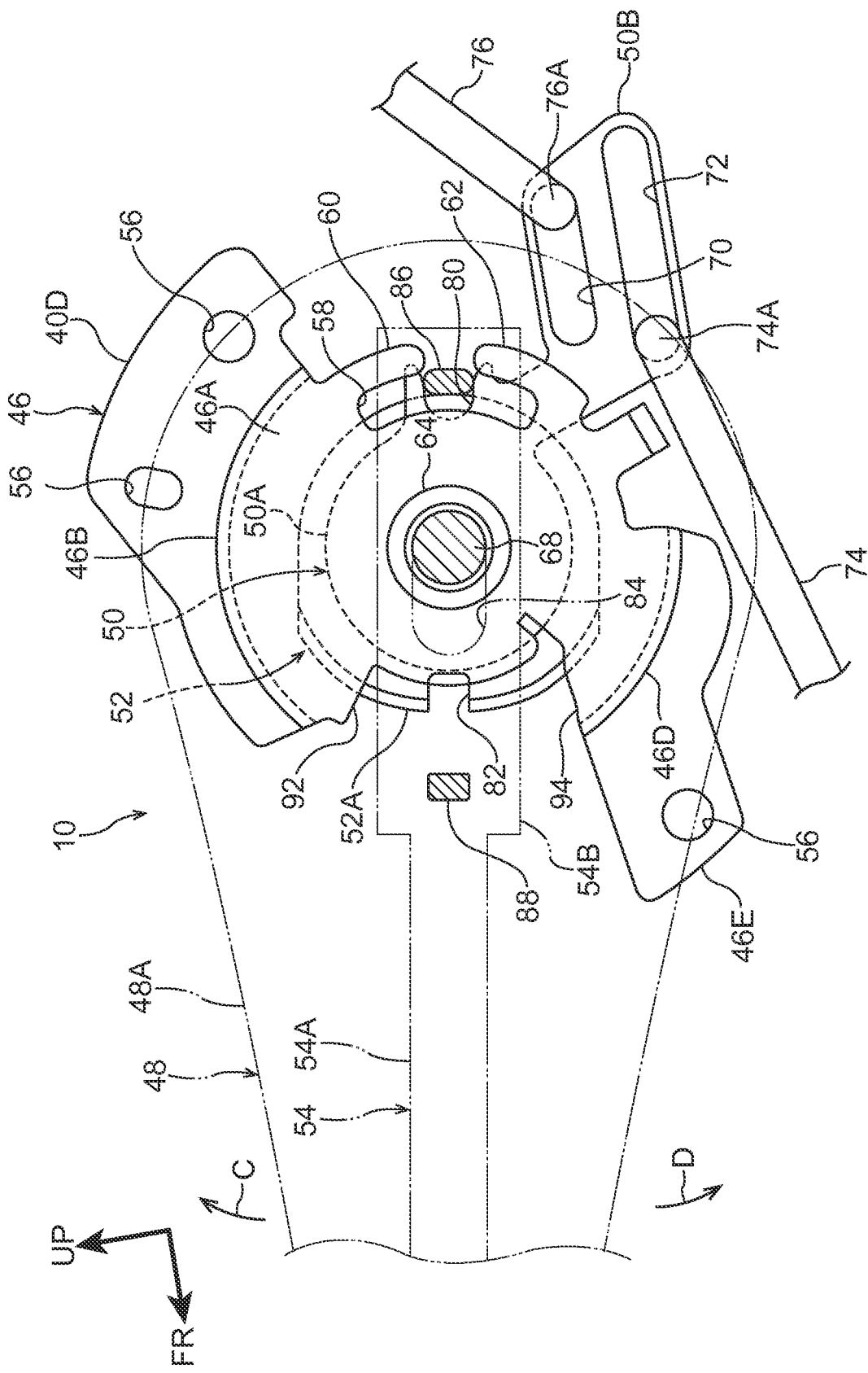
FIG. 2 is a side view showing the structure of main portions of a seat operating device that is provided at the vehicle seat, and is a drawing of a state in which a selector is positioned at one end of a range of movement.
Figure 3:
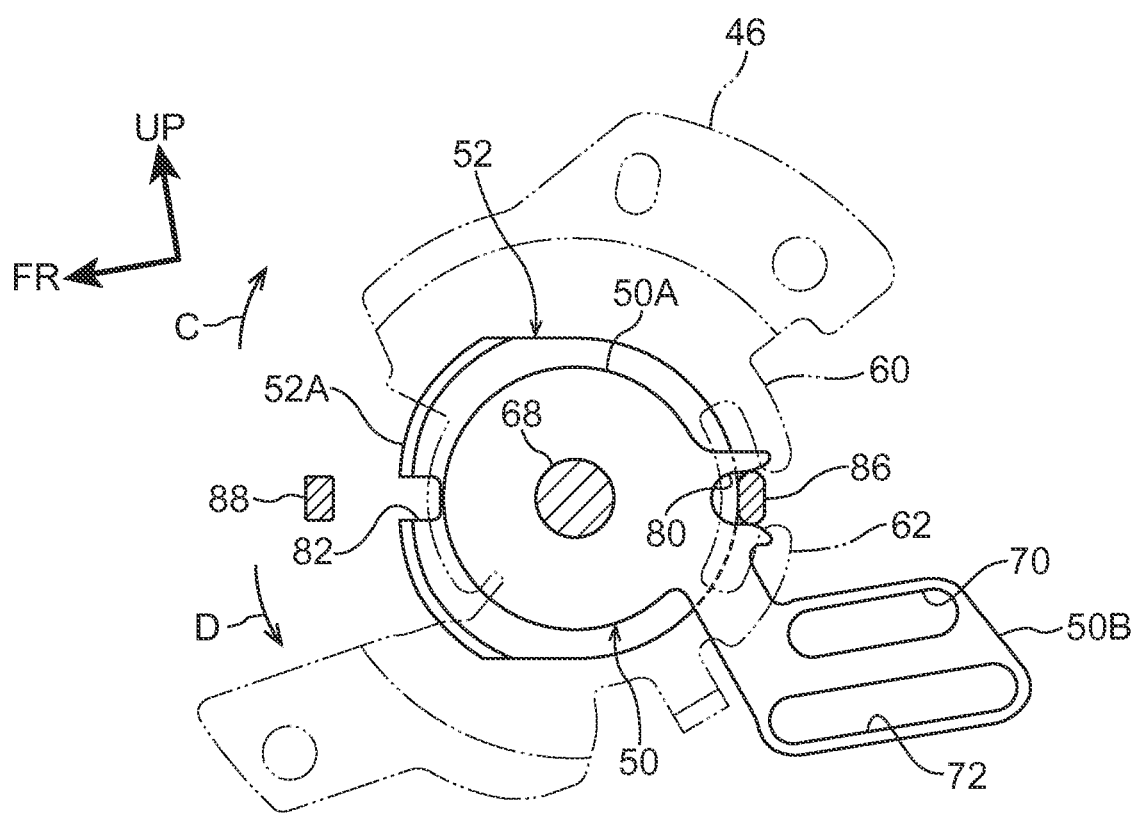
FIG. 3 is a side view showing a portion of the structure illustrated in FIG. 2.

As shown in FIG. 2 and FIG. 3, the seat operating device 10 is structured by a base bracket 46, an operation lever 48 (operation member), a first clutch member 50, a second clutch member 52, and a selector 54 (switching member). The respective structural elements are described hereinafter.

The base bracket 46 is formed from a sheet metal material, and is mounted to the surface at outer side in the vehicle width direction of the seat cushion frame 16 in a state of covering the aforementioned pump-type lifter device from the seat width direction outer side. The base bracket 46 has a side wall portion 46A that faces the seat cushion frame 16 with a gap therebetween, and an upper wall portion 46B and a lower wall portion 46C that extend toward the seat width direction inner side from the upper and lower ends of the side wall portion 46A. The side wall portion 46A is formed in a substantially circular shape as viewed from the seat width direction, and the upper wall portion 46B and the lower wall portion 46C are curved in circular arc shapes along the outer periphery of the side wall portion 46A.

Further, an upper flange portion 46D extends toward the upper side from the end portion at the inner side in the seat width direction of the upper wall portion 46B. A lower flange portion 46E extends toward the lower side from the end portion at the inner side in the seat width direction of the lower wall portion 46C. Bolt holes 56 are formed in the upper flange portion 46D and lower flange portion 46E. Unillustrated bolts, that are inserted through these bolt holes 56, are passed-through the seat cushion frame 16 and are screwed-together with unillustrated nuts. Due thereto, the base bracket 46 is fastened and fixed to the seat cushion frame 16.

A T-shaped groove 58 that is substantially T-shaped is formed in the rear end portion of the side wall portion 46A of the above-described base bracket 46. Due to this T-shaped groove 58 being formed, a pair of stopper portions 60, 62 that are a pair of erroneous operation preventing portions are formed at the rear end portion of the side wall portion 46A. These stopper portions 60, 62 cannot be displaced with respect to the seat cushion frame 16, and face one another in the direction of rotation of the operation lever 48 that is described later. The end portions, at the sides that face one another, of these stopper portions 60, 62 are curved in circular arc shapes as seen from the seat width direction, and a gap is formed between these end portions.

Further, a boss portion 64 that is shaped as a cylindrical tube is provided concentrically at the central portion of the side wall portion 46A of the above-described base bracket 46. A supporting shaft 68 is inserted-through the inner side of this boss portion 64. The supporting shaft 68 is fixed to the boss portion 64, and projects-out inner side and outer side in the seat width direction of the side wall portion 46A. The supporting shaft 68 is disposed coaxially with the input shaft of the aforementioned pump-type lifter device. The operation lever 48 is mounted to a portion of the supporting shaft 68 which portion is further toward outer side in the seat width direction from the side wall portion 46A.

The operation lever 48 is formed in an elongated shape of a resin material, and is structured by a base portion 48A that is shaped as a cylindrical tube having a bottom and that opens toward inner side in the seat width direction, and an arm portion 48B that is tubular and extends toward the seat front side from the base portion 48A. The tube interior of this arm portion 48B communicates with the inner side of the base portion 48A. Further, the supporting shaft 68 is rotatably inserted within an unillustrated boss portion that is provided at the base portion 48A. Due thereto, the operation lever 48 is rotatably supported at the supporting shaft 68, and is mounted to the seat cushion frame 16 via the supporting shaft 68 and the base bracket 46.

An unillustrated spring for returning spans between the above-described operation lever 48 and the seat cushion frame 16. The operation lever 48 is maintained at the neutral position illustrated in FIG. 1 by the urging force of the spring for returning. Further, the first clutch member 50 is mounted to a portion of the supporting shaft 68 which portion is further toward the inner side in the seat width direction from the side wall portion 46A.

The first clutch member 50 is formed of a sheet metal material, and has a main body portion 50A that is formed in a substantial disc shape. The main body portion 50A is disposed between the side wall portion 46A and the pump-type lifter device, in a state in which the plate thickness direction of the main body portion 50A runs along the seat width direction. A circular through-hole is formed in the central portion of the main body portion 50A, and the supporting shaft 68 is inserted-through this through-hole. Due thereto, the first clutch member 50 can rotate around the supporting shaft 68 that is the center of rotation of the operation lever 48, and is mounted to the seat cushion frame 16 via the supporting shaft 68 and the base bracket 46.

A connecting portion 50B extends from the rear end portion of the main body portion 50A toward the seat rear side and lower side. A pair of upper and lower long holes 70, 72, whose respective longitudinal directions run along the seat front-rear direction, are formed in the connecting portion 50B. A lower side connecting member 74, that is formed in an elongated shape by a rod, spans between the long hole 72 and the lock releasing lever 34 of the above-described sliding mechanism 20. One end portion 74A and another end portion 74B in the longitudinal direction of this lower side connecting member 74 are bent toward the inner side in the seat width direction. The end portion 74A is inserted into the long hole 72 so as to be able to rotate in the long hole 72 and so as to be able to slide in the longitudinal direction of the long hole 72. The other end portion 74B is rotatably inserted in a circular hole that is formed in the upper end portion of the lock releasing lever 34. The end portion 74A of the lower side connecting member 74 is positioned at the front end portion of the long hole 72 at usual times.

An upper side connecting member 76, that is formed in an elongated shape by a rod, spans between the long hole 70 and the lock releasing lever 36 of the above-described reclining mechanism 22. One end portion 76A and another end portion 76B in the longitudinal direction of this upper side connecting member 76 are bent toward the inner side in the seat width direction. The end portion 76A is inserted into the long hole 70 so as to be able to rotate in the long hole 70 and so as to be able to slide in the longitudinal direction of the long hole 70. The end portion 76B is rotatably inserted in a circular hole that is formed in one end portion of the lock releasing lever 36. The end portion 76A of the upper side connecting member 76 is positioned at the rear end portion of the long hole 70 at usual times.

Further, a first cut-out portion 80 is formed in the rear end portion of the main body portion 50A, in a vicinity of the upper side of the connecting portion 50B. This first cut-out portion 80 opens toward the outer side in the rotation radial direction of the first clutch member 50 (here, the seat rear side that is opposite to the supporting shaft 68). At usual times, the first cut-out portion 80 faces the gap between the above-described pair of stopper portions 60, 62. The first cut-out portion 80 corresponds to a first selector pin 86 of the selector 54 that is described later.

The second clutch member 52 is provided between the main body portion 50A of the above-described first clutch member 50 and the pump-type lifter device. The second clutch member 52 is formed in a disc shape of a sheet metal material, and is disposed in a state of being coaxial to the supporting shaft 68 and such that the plate thickness direction runs along the seat width direction. The second clutch member 52 is connected coaxially with and so as to be rotate integrally with the input shaft of the pump-type lifter device. Therefore, when the second clutch member 52 is rotated, the height at which the seat cushion frame 16 is disposed with respect to the lower frame 26 is adjusted. In this case, when the second clutch member 52 is rotated in the arrow C direction in FIG. 2, the seat cushion frame 16 is displaced toward the upper side, and, when the second clutch member 52 is rotated in the arrow D direction in FIG. 2, the seat cushion frame 16 is displaced toward the lower side.

A peripheral wall portion 52A, that extends toward outer side in the seat width direction, is provided at the front end portion of the second clutch member 52. A second cut-out portion 82 is formed in the front end portion of the second clutch member 52. This second cut-out portion 82 opens toward the outer side in the rotation radial direction of the second clutch member 52 (here, the seat front side that is opposite to the supporting shaft 68). The second cut-out portion 82 corresponds to a second selector pin 88 of the selector 54 that is described later.

The selector 54 is formed in an elongated shape of, for example, a metal material, and is accommodated at the interior of the operation lever 48 along the longitudinal direction of the operation lever 48. The selector 54 engages with plural supporting portions, not shown in the drawings, that are provided at the operation lever 48, and is supported so as to be able to be operationally moved (so as to be able to be operationally slid) in an longitudinal direction (the rotation radial direction) of the operation lever 48. The selector 54 has a rod portion 54A that is formed in an elongated shape. A plate portion 54B that is plate-shaped is provided at one end portion in a longitudinal direction (the end portion at the seat rear side) of this rod portion 54A. Further, an operation button portion 54C that is solid cylindrical is provided at the other end portion in the longitudinal direction (the end portion at the seat front side) of the rod portion 54A. This operation button portion 54C is inserted-through a circular opening, that is formed in the distal end portion (the end portion at the seat front side) of an arm portion 48B, and projects-out further toward the seat front side than the arm portion 48B.

The plate portion 54B is positioned at the outer side in the seat width direction from the base bracket 46. A long hole 84, that is long along the longitudinal direction of the selector 54, is formed at a central portion in the longitudinal direction of the plate portion 54B. The supporting shaft 68 is inserted through this long hole 84. Due thereto, the selector 54 is supported so as to be able to slide within a range of the long hole 84 with respect to the supporting shaft 68. The first selector pin 86 (first engaging portion) and the second selector pin 88 (second engaging portion), that project-out toward inner side in the seat width direction, are provided at the plate portion 54B.

The first selector pin 86 and the second selector pin 88 are positioned at mutually opposite sides across the supporting shaft 68 that is the center of rotation of the operation lever 48. The side wall portion 46A of the base bracket 46, the first clutch member 50 and the second clutch member 52 are disposed between the first selector pin 86 and the second selector pin 88.

The first selector pin 86 is formed in the shape of a long circle whose longitudinal direction runs substantially along the vertical direction. Both longitudinal direction end portions of the first selector pin 86 (the both end portions along the direction of rotation of the operation lever 48) are made to be circular arc shaped curved surfaces as seen from the seat width direction. The first selector pin 86 is provided such that, in the state in which the selector 54 is positioned at a first operation position (the position shown in FIG. 2) that is one end in the range of movement of the selector 54 with respect to the operation lever 48, the first selector pin 86 fits-together (engages) with the first cut-out portion 80 of the first clutch member 50. Further, the vertical direction dimension of the first selector pin 86 is set to be slightly smaller than the gap between the pair of stopper portions 60, 62, and the first selector pin 86 can pass-through between the pair of stopper portions 60, 62.

The second selector pin 88 is formed in a rectangular shape whose longitudinal direction runs substantially along the vertical direction, and the both longitudinal direction end portions thereof (the both end portions along the direction of rotation of the operation lever 48) are formed in the shapes of flat surfaces. Note that the four corner portions of the second selector pin 88 are chamfered. The second selector pin 88 is provided at the plate portion 54B such that, in the state in which the selector 54 is positioned at the first operation position shown in FIG. 2, the second selector pin 88 is disposed so as to be apart, toward the seat front side, from the second cut-out portion 82.

An unillustrated coil spring spans between the selector 54 and the operation lever 48 that are structured as described above. The selector 54 is urged toward the front end side of the operation lever 48 by this coil spring. Therefore, the selector 54 is usually maintained at the first operation position (one end of the range of movement) that is shown in FIG. 1 and FIG. 2.

In the state in which the selector 54 is positioned at the first operation position in this way, when the arm portion 48B of the operation lever 48 is operated toward the upper side (one side) of the neutral position, the first clutch member 50, at which the first selector pin 86 is fit-together with the first cut-out portion 80, is rotated in the arrow C direction in FIG. 2. Due thereto, the upper side connecting member 76 is pulled diagonally toward the seat front side and lower side, and the lock releasing lever 36 of the reclining mechanism 22 is rotated in the arrow B direction in FIG. 1. Due thereto, locking of the reclining mechanism 22 is released. In this case, since the long hole 72 moves toward the front direction with respect to the one end portion 74A in the longitudinal direction of the lower side connecting member 74 and the one end portion 74A relatively moves toward the rear direction in the long hole 72, the operational force of the operation lever 48 is not transmitted to the sliding mechanism 20.

Further, in the state in which the selector 54 is positioned at the first operation position, when the arm portion 48B of the operation lever 48 is operated toward the lower side (other side) of the neutral position, the first clutch member 50, at which the first selector pin 86 is fit-together with the first cut-out portion 80, is rotated in the arrow D direction in FIG. 2. Due thereto, the lower side connecting member 74 is pulled diagonally toward the seat rear side and upper side, and the lock releasing lever 34 of the sliding mechanism 20 is rotated in the arrow A direction in FIG. 1. Due thereto, locking of the sliding mechanism 20 is released. In this case, since the long hole 70 moves toward the rear direction with respect to the one end portion 76A in the longitudinal direction of the upper side connecting member 76 and the one end portion 76A relatively moves toward the front direction in the long hole 70, the operational force of the operation lever 48 is not transmitted to the reclining mechanism 22.

Figure 4:
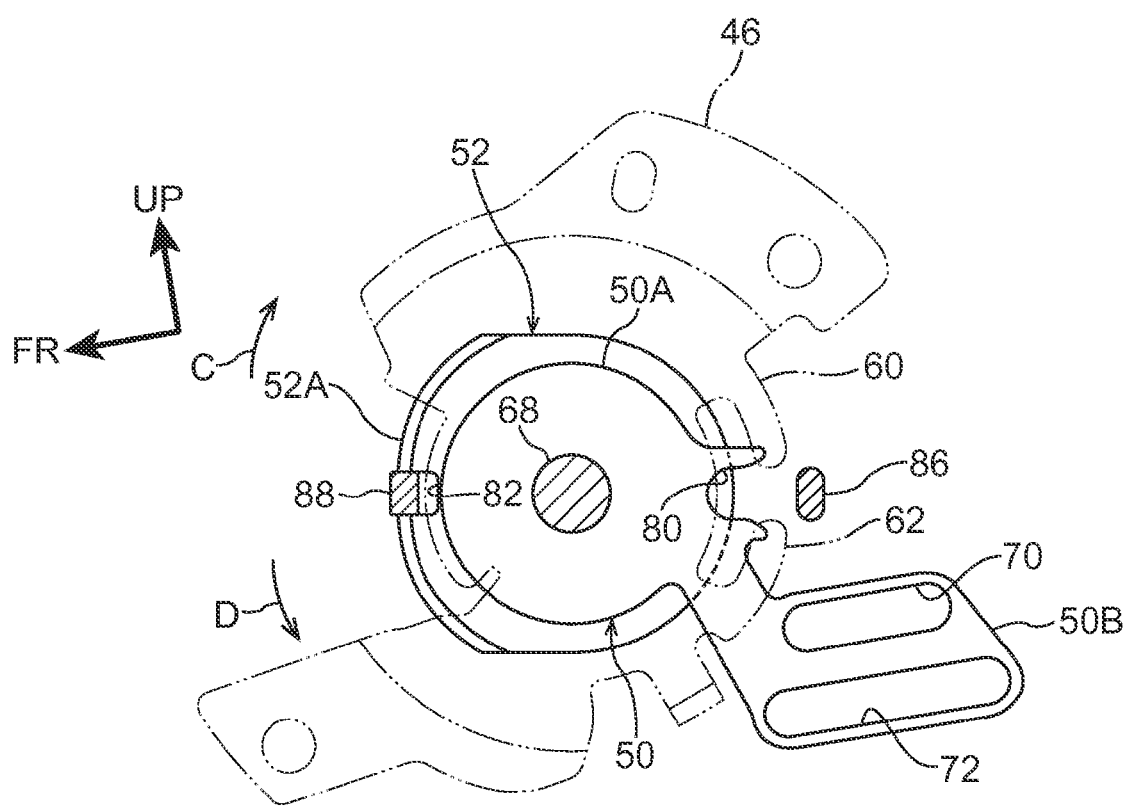
FIG. 4 is a side view that corresponds to FIG. 3 and shows a state in which the selector is positioned at another end of the range of movement.

On the other hand, when the selector 54 is moved toward a second operation position that is the other end of the range of movement of the selector 54 due to the operation button portion 54C being pushed-in toward the operation lever 48 side, as shown in FIG. 4, the first selector pin 86 passes-through between the pair of stopper portions 60, 62 and is displaced toward the seat rear side, and the fit-together state of the first selector pin 86 with the first cut-out portion 80 is released. Further, at this time, the second selector pin 88 fits-together (engages) with the second cut-out portion 82 of the second clutch member 52. In this fit-together state, the planar surfaces of the upper and lower ends of the second selector pin 86 face the peripheral wall portion 52A of the second clutch member 52.

In this way, in the state in which the selector 54 is positioned at the second operation position, when the arm portion 48B of the operation lever 48 is operated toward the upper side of the neutral position, the second clutch member 52, at which the second selector pin 88 is fit-together with the second cut-out portion 82, is rotated in the arrow C direction in FIG. 4 integrally with the input shaft of the pump-type lifter device. Due thereto, the rotational force of this input shaft is transmitted to the rear side link 42 via the pinion and lifter gears, and the seat cushion frame 16 is displaced toward the upper side with respect to the lower frame 26 (the seat height is adjusted higher).

Further, in the state in which the selector 54 is positioned at the second operation position, when the arm portion 48B of the operation lever 48 is operated toward the lower side of the neutral position, the second clutch member 52, at which the second selector pin 88 is fit-together with the second cut-out portion 82, is rotated in the arrow D direction in FIG. 4 integrally with the input shaft of the pump-type lifter device. Due thereto, the rotational force of this input shaft is transmitted to the rear side link 42 via the pinion and lifter gears, and the seat cushion frame 16 is displaced toward the lower side with respect to the lower frame 26 (the seat height is adjusted lower).

Note that, in the state in which the selector 54 is positioned at the first operation position, at the time when the arm portion 48B of the operation lever 48 is operated toward the upper side and the lower side of the neutral position, interference between the first selector pin 86 and the base bracket 46 is prevented due to the first selector pin 86 moving vertically within the T-shaped groove 58. However, in a case in which the operation button portion 54C of the selector 54 is pushed in the midst of this operation of the operation lever 48, operation of the selector 54 toward the second operation position is restricted due to the first selector pin 86 abutting one of the pair of stopper portions 60, 62 from the seat front side.

Further, in the state in which the selector 54 is positioned at the second operation position, at the time when the arm portion 48B of the operation lever 48 is operated toward the upper side and the lower side of the neutral position, interference between the first selector pin 86 and the base bracket 46 is prevented due to the first selector pin 86 moving vertically at the seat rear side of the pair of stopper portions 60, 62. However, in a case in which pushing of the operation button portion 54C of the selector 54 is released in the midst of this operation of the operation lever 48, movement of the selector 54 toward the first operation position is restricted due to the first selector pin 86 abutting one of the pair of stopper portions 60, 62 from the seat rear side.

Further, in the present embodiment, at the time when the arm portion 48B of the operation lever 48 is operated toward the upper side and the lower side, a pair of upper and lower load receiving portions 92, 94, that are provided at the front end portion of the side wall portion 46A of the base bracket 46, and abutment portions, not illustrated in the drawings, that are provided at the operation lever 48, abut one another. Due thereto, further operation of the operation lever 48 is restricted. The shapes of the T-shaped groove 58 and the pair of stopper portions 60, 62 are set such that interference between the first selector pin 86 and the base bracket 46 is prevented at this time as well.

Figure 5:
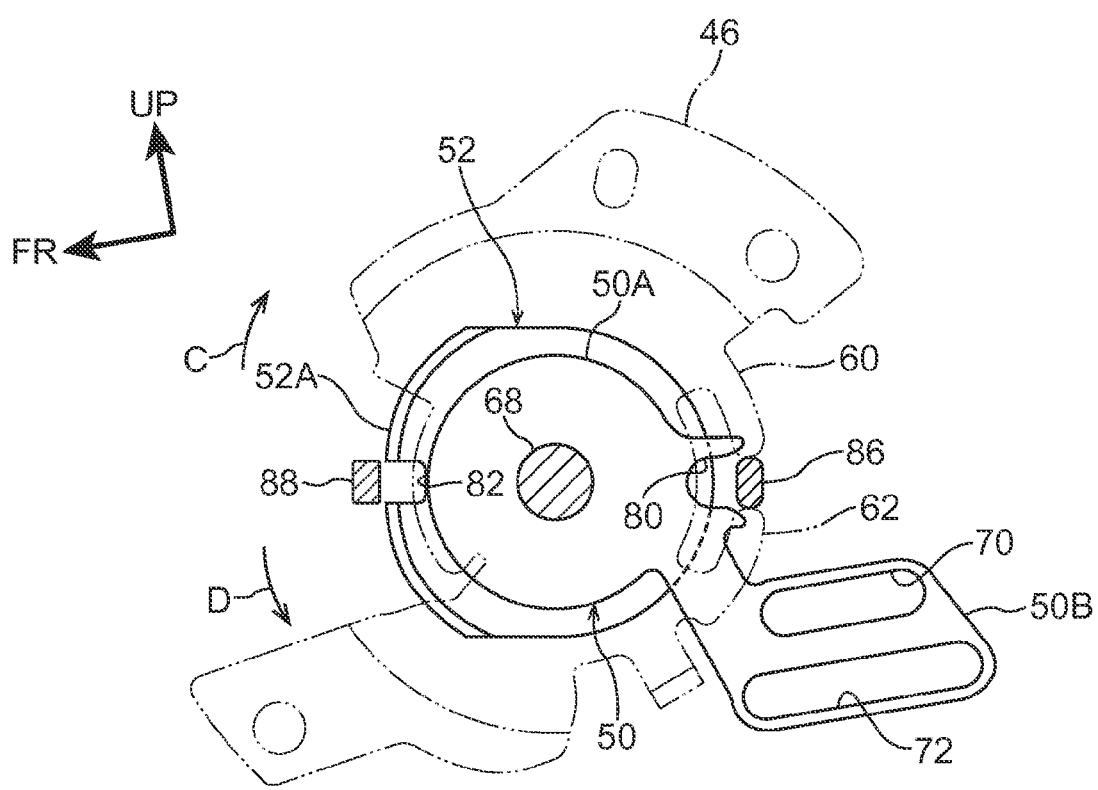
FIG. 5 is a side view that corresponds to FIG. 3 and FIG. 4 and shows a state in which the selector is positioned intermediately in the range of movement.

Moreover, as shown in FIG. 5, in the state in which the selector 54 is positioned between the first operation position and the second operation position (intermediately in the range of movement), the first selector pin 86 is disposed between the pair of stopper portions 60, 62. In this state, rotational operation of the operation lever 48 is restricted due to the first selector pin 86 abutting the pair of stopper portions 60, 62 in the direction of rotation of the operation lever 48.

Further, in the present embodiment, a dimension, that runs along the longitudinal direction (the moving operation direction) of the selector 54, of the first selector pin 86, that fits-together with the first cut-out portion 80 of the first clutch member 50, is set to be smaller than a dimension of the second selector pin 88 that fits-together with the second cut-out portion 82 of the second clutch member 52. The strength of the first selector pin 86 is set on the basis of the operational force needed in order to release the locking of the sliding mechanism 20 and the reclining mechanism 22, and is set to be lower than the strength of the second selector pin 88 that is set on the basis of the operational force needed in order to adjust the lifter mechanism 24. Note that the strengths of the first selector pin 86 and the second selector pin 88 are set by the sectional moduli (the shape, thickness and the like) thereof and the materials thereof.

<Operation and Effects of Embodiment>

The operation and effects of the present embodiment are described next.

In the present embodiment, the operation lever 48 is mounted to the seat main body 14 so as to be able to be rotatingly operated, and the selector 54 is mounted to the operation lever 48 so as to be able to move in the rotation radial direction of the operation lever 48. In the state in which the selector 54 is positioned at the first operation position, the first selector pin 86 that is provided at the selector 54 is fit-together with the first cut-out portion 80 of the first clutch member 50 (the state shown in FIG. 2 and FIG. 3). When, in this state, the operation lever 48 is rotatingly operated, the first clutch member 50 rotates integrally with the operation lever 48, and the operational force of the operation lever 48 is transmitted to the sliding mechanism 20 or the reclining mechanism 22 that are connected to the first clutch member 50.

On the other hand, in the state in which the selector 54 is positioned at the second operation position, the second selector pin 88 that is provided at the selector 54 is engaged with the second cut-out portion 82 of the second clutch member 52 (the state shown in FIG. 4). When, in this state, the operation lever 48 is rotatingly operated, the second clutch member 52 rotates integrally with the operation lever 48, and the operational force of the operation lever 48 is transmitted to the lifter mechanism 24 that is connected to the second clutch member 52.

In the present embodiment, the first selector pin 86 and the second selector pin 88 of the selector 54 are positioned at mutually opposite sides across the supporting shaft 68 that is the center of rotation of the first clutch member 50 and the second clutch member 52. Further, the first cut-out portion 80 of the first clutch member 50, with which the first selector pin 86 fits-together, and the second cut-out portion 82 of the second clutch member 52, with which the second selector pin 88 fits-together, respectively open outwardly in the rotation radial directions of the respective clutch members 50, 52. Because of such a structure, as compared with a structure in which a cut-out portion, that opens inwardly in the rotation radial direction, is formed in one of the first clutch member 50 and the second clutch member 52, and one selector pin is moved between this inwardly-facing cut-out portion and an outwardly-facing cut-out portion that is formed in the other clutch member, the one clutch member can be made to be compact.

Moreover, in the present embodiment, the shapes and the sizes of the first selector pin 86 and the second selector pin 88 can respectively be selected individually in accordance with the needed operational forces of the sliding mechanism 20 and the reclining mechanism 22 that are connected to the first clutch member 50, and the lifter mechanism 24 that is connected to the second clutch member 52. Therefore, the flexibility for design can be improved.

Further, in the present embodiment, in a state in which the selector 54 is positioned intermediately in the range of movement with respect to the operation lever 48, i.e., in a state in the midst of operation of the selector 54, the first selector pin 86 that is provided at the selector 54 is disposed between the pair of stopper portions 60, 62 that are provided so as to be unable to be displaced with respect to the seat cushion frame 16. In this state, rotational operation of operation lever 48 is restricted due to the first selector pin 86 abutting the pair of stopper portions 60, 62 in the direction of rotation of the operation lever 48. Due thereto, erroneous operation which is caused by rotationally operating the operation lever 48 in the midst of operation of the selector 54 can be prevented.

Moreover, in the present embodiment, the operation lever 48 and the first clutch member 50 are mounted to the seat cushion frame 16 via the base bracket 46, and the pair of stopper portions 60, 62 are provided at the base bracket 46. Namely, the base bracket 46, that is provided for mounting the operation lever 48 and the first clutch member to the seat main body 14, also has the function of restricting the rotational operation of the operation lever 48 in the midst of the operation of the selector 54. Therefore, the number of parts can be reduced.

Further, in the present embodiment, the dimension, along the direction of the moving operation of the selector 54, of the first selector pin 86, that is disposed between the pair of stopper portions 60, 62 in the state in which the selector 54 is in the midst of being operated, is set to be smaller than that of the second selector pin 88. Due thereto, the amount of movement (the operation stroke) of the selector 54 that is needed in order for the first selector pin 86 to pass-through between the pair of stopper portions 60, 62 can be set to be short. Therefore, the operability of the selector 54 can be improved.

Note that, also at the seat adjusting device that was described in the Related Art section (hereinafter called the conventional example), it is preferable to provide a stopper for preventing erroneous operation so as to restrict operation of the operation lever in the midst of operation of the switching knob. However, when such a stopper for preventing erroneous operation is disposed between the reclining plate and the lifter plate in the conventional example, the operation stroke of the switching knob becomes long. Namely, when the stopper for preventing erroneous operation is formed to be small in order to make the stroke of the switching knob short, the strength of the stopper for preventing erroneous operation is insufficient. Therefore, the operation stroke of the switching knob must be made to be long. In this way, ensuring the strength of the stopper for preventing erroneous operation and shortening of the operation stroke of the switching knob (the selector) are contradictory requirements. However, in the present embodiment, such contradictory requirements can both be satisfied by the above-described structure.

<Supplemental Description of Embodiment>

The above-described embodiment is structured such that the pair of stopper portions 60, 62 are provided at the side of the first selector pin 86. However, the present invention is not limited to this, and may be structured such that a pair of stopper portions are provided at the side of the second selector pin 88 (the second engaging portion).

Further, the above-described embodiment is structured such that the sliding mechanism 20 and the reclining mechanism 22 that serve as locking-type adjusting mechanisms are connected to the first clutch member 50, and the lifter mechanism 24 that serves as an operation-type adjusting mechanism is connected to the second clutch member 52. However, the present invention is not limited to this, and the types and numbers of the adjusting mechanisms that are connected to the first clutch member and the second clutch member can be changed appropriately. Further, adjusting mechanisms other than those described above, for example a lumbar support mechanism, a tilting mechanism, an ottoman mechanism, a side support mechanism, or the like, are included among the adjusting mechanisms that are connected to the first clutch member and the second clutch member.

Further, the above-described embodiment is structured such that the operation lever 48 (operation member) is mounted to the seat main body 14 so as to be able to rotate around an axis that runs along the seat width direction. However, the present invention is not limited to this. It suffices for the operation lever to be a member that is mounted to the seat main body so as to be able to be rotatingly operated, and the direction of the rotational operation of the operation lever can be changed appropriately.

Further, although the above-described embodiment is structured such that the pair of stopper portions 60, 62 are provided at the base bracket 46, the present invention is not limited to this, and may be structured such that the pair of stopper portions are fixed to the seat main body separately from the base bracket. Further, there may be a structure in which the pair of stopper portions 60, 62 are omitted from the above-described embodiment.

In addition, the present invention can be implemented by being modified in various ways within a scope that does not deviate from the gist thereof. Further, the scope of the present invention is, of course, not limited to the above-described embodiment.

What is claimed is:

1. A seat operating device comprising:
    an operation member that is mounted to a seat main body of a vehicle seat so as to be rotatingly operated;
    a first clutch member that is mounted to the seat main body so as to rotate around a rotational center of the operation member, and that is connected to an adjusting mechanism that the seat main body is equipped with, and in which is formed a first cut-out portion that opens outwardly in a rotation radial direction of the first clutch member;
    a second clutch member that is mounted to the seat main body so as to rotate around the rotational center of the operation member, and that is connected to another adjusting mechanism that the seat main body is equipped with, and in which a second cut-out portion, that opens outwardly in a rotation radial direction of the second clutch member, is formed at an opposite side of the first cut-out portion across the rotational center;
    a switching member that is mounted to the operation member so as to be movingly operated in a rotation radial direction of the operation member, and that has a first engaging portion and a second engaging portion that are positioned at mutually opposite sides across the rotational center, and, in a state in which the switching member is positioned at one end of a range of movement of the switching member, the first engaging portion engages with the first cut-out portion, and, in a state in which the switching member is positioned at another end of the range of movement of the switching member, the second engaging portion engages with the second cut-out portion; and
    a pair of erroneous operation preventing portions that are provided so as to be unable to be displaced with respect to the seat main body and that face one another in a direction of rotation of the operation member,
    in a state in which the switching member is positioned intermediately in the range of movement, one of the first engaging portion and the second engaging portion is disposed between the pair of erroneous operation preventing portions.

2. The seat operating device of claim 1, further comprising a base bracket,
    wherein the operation member and the first clutch member are mounted to the seat main body via the base bracket, and the base bracket includes the pair of erroneous operation preventing portions.

3. The seat operating device of claim 1, wherein a dimension, along a direction of movement of the switching member, of one of the first engaging portion and the second engaging portion is set to be smaller than a dimension of another of the first engaging portion and the second engaging portion.

4. A vehicle seat comprising:
    the seat operating device of claim 1 in which the operation member, the first clutch member and the second clutch member are mounted to the seat main body, and the adjusting mechanism and the other adjusting mechanism are connected to the first clutch member and the second clutch member respectively; and
    the seat main body is for seating of a passenger and includes the adjusting mechanism and the other adjusting mechanism.

* * * * *